UNITED STATES PATENT OFFICE.

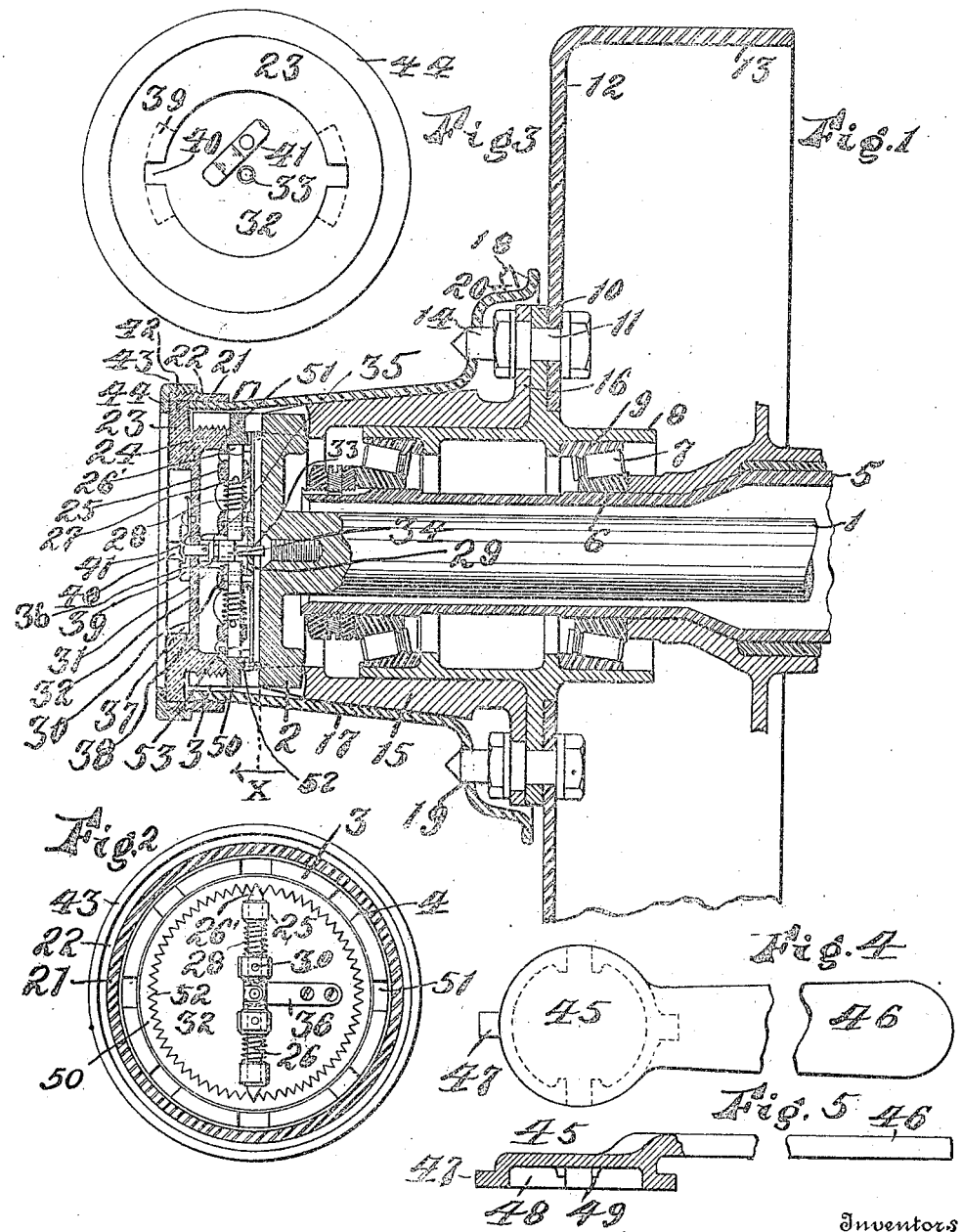

EDWARD NALL AND WILLIAM C. TYLER, OF AKRON, OHIO, ASSIGNORS TO THE GOODYEAR TIRE AND RUBBER COMPANY, OF AKRON, OHIO, A CORPORATION OF OHIO.

WHEEL-HUB.

1,130,425.  Specification of Letters Patent.  Patented Mar. 2, 1915.

Application filed May 8, 1914. Serial No. 837,282.

*To all whom it may concern:*

Be it known that we, EDWARD NALL and WILLIAM C. TYLER, citizens of the United States, residing at Akron, in the county of Summit and State of Ohio, have invented new and useful Improvements in Wheel-Hubs, of which the following is a specification.

This invention relates to improvements in hubs for vehicle wheels and has more especial relation to detachable hubs used for holding what are known as suspension or wire spoked wheels, said wheels equipped with rims provided with elastic tires whereby a spare wheel equipped with an inflated tire may be carried to be used in cases of emergency by replacing the wheel with a deflated or injured tire by the spare wheel and its inflated tire.

The object of the invention is to provide improved means for locking and holding the spare wheel on the vehicle axle to permit the easy placement and removal of the wheel.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variation and modifications can be resorted to which come within the scope of the matter hereinafter claimed.

In the drawings in which similar reference numerals indicate like parts in the different figures, Figure 1, is a vertical, central, sectional view of our improved locking device and so much of the hub and axle of a vehicle wheel as will illustrate its use in connection therewith; Fig. 2, is a sectional view on line X of Fig. 1; Fig. 3, is an end elevation looking from the left in Fig. 1, and, Figs. 4 and 5, are plan and sectional views of a wrench employed for operating the device.

The device is adapted to be used in connection with the well known type of vehicle axle embodying a floating axle 1, provided with a head 2 having a toothed peripheral portion at the outer end preferably formed integrally therewith. Surrounding the floating axle 1 is a sleeve 5 on which are races 6 for roller-bearings 7. Inclosing the sleeve 5 is a cylindrical sleeve 8 provided with tracks or races 9 to receive the rollers 7. The sleeve 8 is provided with a radial flange 10 to which is secured by means of bolts 11 a cup-shaped member 12 having a lateral flange 13 the inner face of which is engaged by a brake. The hold-fast members 11 are provided with projecting ends forming studs 14 for a purpose to be later described. Inclosing the sleeve 8 to the left of the flange 10 is a sleeve 15 the outer face of which is conically-formed and it is further provided with a radial flange 16 provided with apertures registering with the apertures in the flange 10 and member 12 to permit the insertion through said registering apertures of the hold-fast members 11. The opposite end of the sleeve 15 is provided with laterally-projecting lugs 3 spaced apart to leave slots 4 between them to receive the ends of the head 2 of the axle 1. The inner faces of the lugs 3 projecting from the head 2 of the floating axle are provided with a continuous screw thread.

The detachable hub comprises a hollow frusto-conically-formed member 17 adapted to inclose and fit the inclined outer conical face of the sleeve 15 and is further provided with a curved marginal flange 18 provided with apertures 19 adapted to receive the studs 14 whereby the hub 17 is held against independent rotation with respect to the sleeve 8. The hub 17 is further provided with spokes 20 which radiate therefrom and the outer ends of which are connected with the wheel rim, (not shown). The outer portion of the smaller end of the hub 17 is provided with a cylindrical portion 21 on which is shrunk a sleeve 22 having exteriorly-arranged screw threads for a purpose to be described.

In order to hold the hub in position shown in Fig. 1, that is to say, with the studs 14 engaging in the apertures 19 and with the conically-formed portion of the hub snugly fitting the inclined conical portion of the sleeve 15 there is provided a locking member 23 consisting of a tubular portion 24 the outer face of which is provided with screw threads adapted to intermesh with the screw threads on the inner faces of the lateral lugs 3. The locking member 23 is further provided with two pairs of radially-apertured lugs 25, the apertures in the two pairs being in alinement with each other and the pairs of lugs arranged diametrically in alinement on opposite sides of the center of the locking member 23. Radially shiftably mounted in the apertures as bearings in each pair of lugs 23 are detents 26 the outer ends 26' of which are sharpened for a purpose to be later described. Each detent bears a projecting pin 27 positioned between the members of each pair of lugs 25 and between the pins 27 and one of the lugs 25 is a coiled resilient element 28 the normal tendency of which is to outwardly shift the respective detent in connection with which it is employed. Secured to the inner lugs 25 of each pair is a plate 29 from which project a pair of pins 30 which extend through suitable apertures in lugs 25 and also through suitable slots in the detent 26 to prevent rotation of the detents on their own axes while permitting their radial shifting. The face of the locking member 23 which is opposite to the head 2 of the floating axle is cup-shaped and is provided with a pair of radial ribs 31 integral with the lugs 25 and the bottom of the cup-shaped portion is formed by a wall 32 extending transversely of the axis of the floating axle 1. In the center of the wall 32 is an opening constituting a bearing and in the center of the plate 29 is a bearing in alinement with the opening in the wall 32. Mounted in the bearings is a pin 33 having an enlargement 34 and further provided with a projecting pin 35. Secured to the wall 32 is a spring 36 which engages the pin 33 between the pin 35 and the enlargement 34 and has a normal tendency to shift the locking pin 33 to the left in Fig. 1 to cause the end thereof to project from the opening in the wall 32. The outer or left face of the locking member 23 is provided with a counterboard portion 37 surrounding the opening which forms the bearing for the shiftable pin 33 and formed with an outer wall 38. In the outer wall 38 and diametrically opposed to one another are a pair of undercut slots 39 concentric with the axis of the pin 33 and extending in open communication with the counterboard portion 37 and in communication with the undercut slots 39 are notches 40 for a purpose to be later described. On the outer or left face of the wall 32 is a pivoted keeper 41 the function of which is to hold the shiftable pin 33 in the position shown in Fig. 1 when said keeper is in its operative position, and to thereby overcome the influence of the spring 36. The member 23 is provided with a radially-extending flange 42 which projects outwardly beyond the ends of the lugs 3 and engages the end of the cylindrical portion 21 of the hub 17 for holding it in operative engagement with the sleeve 15. Adapted to be positioned on the threaded portion of the sleeve 22 which is secured on the cylindrical portion 21 of the hub, is an annular collar 43 provided with an inwardly-extending flange 44 projecting inwardly beyond the outer edge of the flange 42.

In Figs. 4 and 5 is shown a wrench used for operating the locking device, and this wrench comprises a head 45 with a handle 46. The diameter of the head 45 is such as to permit its ready insertion in the counterbored opening 37 in the locking device 23 and the head is further provided with a pair of oppositely-disposed radially-projecting lugs 47 adapted to be received in the notches 40 and to move in the undercut slots 39 when the head 45 is rotated by shifting the handle 46. The head 45 is cup-shaped, that is to say, provided with a recess in its under face and projecting downwardly from the upper wall of the cup-shaped portion 48 are a pair of lugs 49 adapted when the head 45 is positioned in the counterbored opening 37 to engage the keeper 41 and shift its position.

Adapted to be held in position by means of the locking device 23 is a ring 50 the outer periphery of which is provided with a plurality of radially-projecting lugs 51 suitably spaced and of proper size to be inserted in the slots 4 between the lugs 3. The inner face of the ring 50 is provided with a circumferential series of teeth 52 arranged to be engaged by the sharpened ends 26' of the detents 26. The ring 50 is further provided with an inwardly-extending flange 53 positioned between the outer sharpened ends 26' of the detents 26 and the inner face of the locking member 23 and extending inwardly farther than the inner positions of the outer ends of the detents 26 thereby preventing lateral movement of the ring.

In setting up a vehicle wheel embodying this invention, the hub 17 bearing the spokes and rim is first positioned by shifting the hub over the sleeve 15 until the studs 14 are inserted in the openings 19 of the flange 18 on the hub 17. The wrench is then placed in the counterbored opening 37 and given a sufficient rotation to shift the keeper 41 to the position shown in Fig. 3 permitting the spring 36 to force the pin 33 outwardly to shift the enlargement 34 thereof outwardly from between the inner ends of the detents 26. The locking device which constitutes the member 23 carrying the detents 26 and the ring 50 which is held in position by means of the ends of the detents engaging the flange 53 thereof is positioned by arranging the radial lugs 51 thereof in registration with the slots 4 between the lugs 3 of the floating axle. When in this position the entire locking device is forced to the right in Fig. 1 until the threads on the outer face of the locking member 23 engages the screw threads on the inner faces of the lugs 3, whereupon, and by use of the wrench, if necessary, the entire locking member 23 is screwed down, in doing which, the sharpened points of the detents 26 run over and are inwardly shifted by engagement with the teeth 52. The rotation of the member 23 is carried on until the radial flange 42 of the member 23 has forced the hub 17 to its seat on the conical face of the sleeve 15. The wrench is then given a partial reverse rotation sufficient to force the keeper 41 over the end of the shiftable pin 33 which forces the enlargement 34 thereof between the inner ends of the detents 26 preventing their being inwardly-shifted, thereby locking their sharpened ends 26' in the teeth 52 which prevents an unintentional reverse rotation of the member 23 after which the wrench is withdrawn and the annular collar 43 is screwed onto the threaded portion of the sleeve 22 on the hub 17 which closes the opening between the outer face of the radial flange 42 of the keeper 23 and the end of the collar 22.

We claim:—

1. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member provided with a plurality of lugs adapted to be positioned in the spaces between the lugs on said permanent hub, and releasable means carried by said locking member and engaging said ring-shaped member for holding the former against independent rotation.

2. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member having peripheral lugs adapted to be inserted in the notches between the lugs on said permanent hub, the inner face of said ring being provided with teeth, an outwardly spring-pressed detent carried by said locking member and engaging said teeth for holding said locking member against rotation.

3. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member carried by said locking member and provided with peripheral lugs adapted to be inserted in the notches between the lugs on said permanent hub, a member carried by said locking member and moving outwardly for engagement with the inner face of said ring for preventing said locking member from independent reverse rotation.

4. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member having peripheral lugs adapted to be positioned in the notches between the lugs on said permanent hub, a radially-shiftable detent carried by said locking member and engaging the inner face of said ring for preventing the reverse rotation of said locking member, resilient means for normally moving said shiftable member outwardly to engage the inner face of said ring, and a second locking member engaging said shiftable member for holding it against inward movement.

5. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member having peripheral lugs adapted to be positioned in the spaces between the lugs on said permanent hub, said ring provided with an inwardly-projecting flange positioned between it and said locking member, an outwardly-moving spring-pressed detent carried by said locking member and engaging the inner face of said ring for holding said locking member against rotation, said detent engaging the lateral flange on said ring for coupling the ring and locking member together.

6. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member carried by said locking member and provided with peripheral lugs, said lugs adapted to interengage with the lugs on said permanent hub, a spring actuated detent normally moving outwardly to engage the face of said ring and carried by said locking member, said detent when in engagement with said ring constituting an abutment for holding said locking member against independent rotation, means for normally forcing said detent outward and means for holding said detent against inward movement.

7. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub member, a locking member having screw threads engaging with the screw threads on said lugs and provided with means engaging the removable hub for locking it in operative position, a ring-shaped member carried by said locking member and provided with peripheral lugs, said lugs adapted to interengage with the lugs on said permanent hub, a spring-actuated detent normally moving outward to engage the face of said ring and carried by said locking member, said detent when in engagement with said ring constituting an abutment for holding said locking member against independent rotation, means for normally forcing said detent outward, and means for loosely coupling said ring and locking member together.

8. In a vehicle wheel, a permanent hub member provided at its outer end with a plurality of spaced lugs providing notches between them, the inner faces of said lugs provided with a continuous screw thread, an axle having means adapted to engage in the notches between said lugs, a detachable hub member sleeved over said permanent hub, a locking member having screw threads engaging with the screw threads on said lugs and provided with means engaging the removable hub for locking it in operative position, a ring-shaped member carried by said locking member and provided with peripheral lugs adapted to interengage with the lugs on said permanent hub and further interiorly toothed, a radially-moving detent carried by said locking member and engaging said teeth for holding the former against independent rotation, resilient means for shifting said detent outwardly to normally engage said teeth, a shiftable member constituting an abutment for locking said detent against independent movement, and coupling means carried by said locking member and said ring-shaped member for loosely coupling them together.

In testimony whereof we have hereunto set our hands in presence of two subscribing witnesses.

EDWARD NALL.
WILLIAM C. TYLER.

Witnesses:
ROSE M. LE MIEUX,
ANNA J. GILHOOLY.